United States Patent [19]

Katou

[11] Patent Number: 4,998,980
[45] Date of Patent: Mar. 12, 1991

[54] CASTING TIRE INCLUDING CONTINUOUS CIRCUMFERENTIAL SIDEWALL INDENTATIONS

[75] Inventor: Masayuki Katou, Kobe, Japan
[73] Assignee: Sumitomo Rubber Industries, Ltd., Hyogo, Japan
[21] Appl. No.: 252,390
[22] Filed: Oct. 3, 1988
[30] Foreign Application Priority Data
  Oct. 8, 1987 [JP] Japan ................... 62-255922
[51] Int. Cl.⁵ .................................. B60C 7/10
[52] U.S. Cl. .................................... 152/324
[58] Field of Search ............... 152/324, 326, 323, 520, 152/452

[56] References Cited

U.S. PATENT DOCUMENTS

| | | | |
|---|---|---|---|
| 826,622 | 7/1906 | Swinehart | 152/324 |
| 1,040,074 | 10/1912 | Weiss | 152/326 |
| 1,477,564 | 12/1923 | Hulse | 152/324 |
| 1,597,381 | 8/1926 | Lambert | 152/324 |
| 1,641,150 | 9/1927 | Brubaker | 152/324 |
| 1,662,007 | 3/1928 | Kuhlke | 152/324 |
| 3,977,453 | 8/1976 | Coran et al. | 152/323 |
| 4,071,279 | 1/1978 | Chung | 152/452 X |
| 4,140,165 | 2/1979 | Lapeyre | 152/452 |

FOREIGN PATENT DOCUMENTS

| | | | |
|---|---|---|---|
| 0157283 | 10/1953 | Australia | 152/324 |
| 6859 | 12/1955 | Fed. Rep. of Germany | 152/324 |
| 0195260 | 9/1923 | United Kingdom | 152/324 |
| 2119724 | 11/1983 | United Kingdom | 152/326 |

Primary Examiner—Michael W. Ball
Assistant Examiner—Geoffrey L. Knable
Attorney, Agent, or Firm—Birch, Stewart, Kolasch & Birch

[57] ABSTRACT

A casting tire includes an elastic main body having a tread surface and sidewall surfaces extending one from each edge of the tread surface. The main body is provided with at least one indentation in part of a region including the tread surface and the sidewall surfaces, whereby the tire can be manufactured by casting elastic material, such as rubber and synthetic resin, using a casting mould, and the tire exhibits characteristics similar to that of the pneumatic tires.

12 Claims, 8 Drawing Sheets

CASTING TIRE INCLUDING CONTINUOUS CIRCUMFERENTIAL SIDEWALL INDENTATIONS

The present invention relates to a non-expansible tire, and more particularly a casting tire, which can be manufactured by casting elastic material, such as rubber, synthetic resin and the likes, using a casting mould, and which has character similar to that of the pneumatic tires.

In almost every kind of vehicle, the pneumatic tires such as bias ply tire or radial ply tire are used. However, non-expansible type tires, that is solid tires, have been used only for special purposes, for example, for industrial vehicles such as forklift trucks, subway cars, and the like.

Such pneumatic tires are generally manufactured by the flat tire method. This method comprises the following many complex processes:

assembling rubberized tire fabrics on a cylindrical tire building drum, turning up both edges of the assembled fabrics around bead wires, adhering successively rubber sidewalls, a rubber tread and the likes thereon to form a row cover tire, putting a tubelike air bag inside the row cover tire, inflating the air bag while decreasing the span between the beads at the same time to shape the row cover tire into a toroidal form, and heating and vulcanizing it in a mould.

Furthermore, in the case of a radial ply tire, processes for assembling a belt are added thereto to make the method further complicated.

On the other hand, the solid tires can be produced through the casting method suitable for mass production such as transfer moulding and injection moulding. However, in order to maintain the resistance to tread wear and the durability of the tire, the rigidity of tire is reinforced to become excessively large, and accordingly such solid tires have been employed for only the limited uses as described above.

Therefore, by using such casting mould A as shown in FIG. 14, trials to produce a pneumatic tire T having the same shape as a pneumatic tire manufactured through the above-mentioned flat tire method, have been made, but such tires are not put into practical use because it is difficult to extract a disklike core B which forms the cavity in the tire, and this makes the massproduction impossible.

It is, therefore, an object of the present invention to provide a casting tire, in which a tire main body having elasticity is provided with an indentation in part of a region including a tread surface and sidewall surfaces thereof to reduce the rigidity of tire, and which is useable in various kinds of vehicles, and free from puncture, and further suitable for mass production through the use of the above-mentioned methods. The casting tires according to the present invention will now be described in detail with reference to the accompanying drawings, in which.

Figure 2:
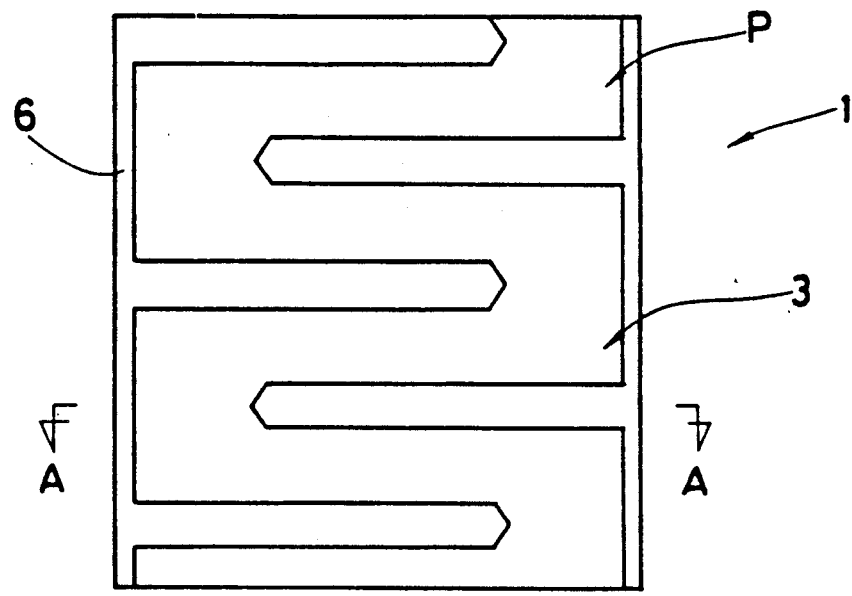
FIG. 2 is a plan view showing the tread pattern thereof.

In the drawings, casting tire 1 of the invention comprises a main body 2 made of a elastic material having a tread surface 3 and two sidewall surfaces, and at least one indentation 6 is formed in part of a region 5 including the tread surface 3 and the sidewall surfaces 4.

The main body 2 is circular, and the tread surface 3 is defined as the ground contacting region of the outer circumferential surface thereof. Each sidewall surface 4 is defined as a region corresponding to the outer surface of a portion of a general pneumatic tire including a shoulder, a sidewall and a bead on each side thereof.

Further, the main body 2 is made of elastic material suitable for an injection moulding such as rubber (for example, synthetic rubber such as SBR, BR, IR or natural rubber) or synthetic resin (for example, polyurethane, polyester). Preferably, the main body is reinforced by fabric, cords, and/or fibers such as carbon fibers and glass fibers.

The indentation 6 is extended inward of the main body 2 from the surface thereof.

The indentation increases the surface area of the base body, and decreases the rigidity thereof.

Accordingly, the heat radiation is increased by the indentation 6, and it becomes possible for the present invention to employ such material as has a low melting point like urethane, which can not be employed for a solid tire according to the prior art because it is sometimes melted by the heat generated under high speed running and/or heavy loads.

Further, because the indentation 6 decreases the tire rigidity, it becomes also possible for the present invention to employ such material as has a high melting point but has a high rigidity like polyester, which have not been used heretofore by the reason of the resultant high rigidity.

Some embodiments of the present invention will now be explained.

FIGS. 1 to 4 show the first embodiment of the present invention, wherein the casting tire 1 has the indentations 6 formed on each sidewall surface 4 of the main body 2, and each indentation is extended continuously in the circumferential direction of the tire, and also extended in the axial direction of the tire, but terminated in the main body 2 to form a bottom.

In FIGS. 1 to 4, the casting tire 1 is mounted on a two-piece rim 12 for pneumatic tires.

Figure 1:
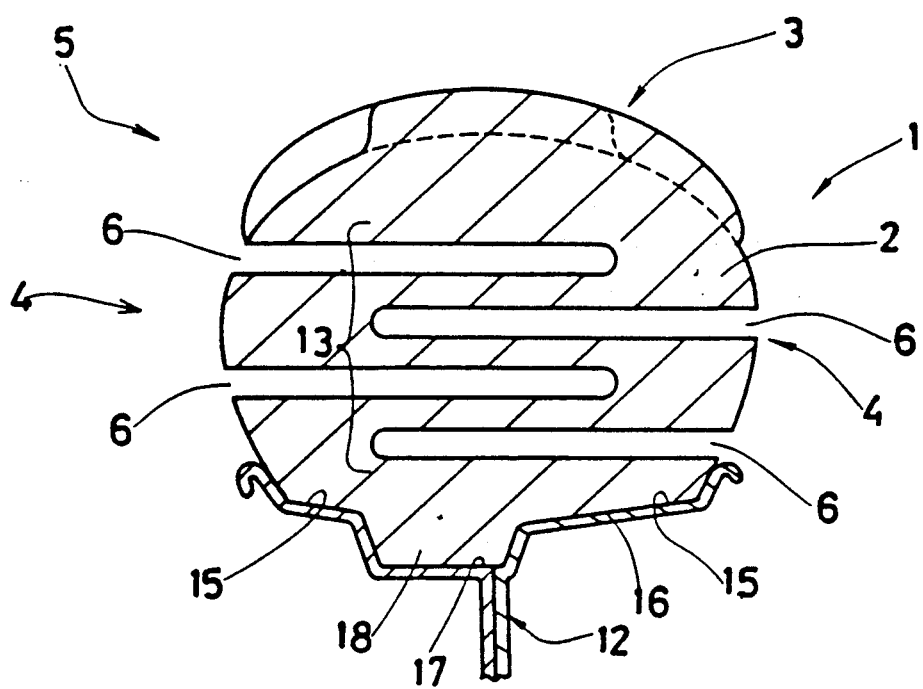
FIG. 1 is a sectional view showing the first embodiment of the present invention taken along the line A—A of FIG. 2.

The cross sectional profile of the main body 2 is rough circular as shown in FIG. 1, and a tread pattern P, in this example, a lug pattern is provided on the tread surface 3.

The indentations 6 are arranged successively in the radial direction, and the indentations open alternately at the sidewall surfaces 4.

The inner end or bottom of each indentation extends beyond the center of the main body, in this example, the equatorial plane of the tire, thereby forming in the main body the spring-elastic portion 13 which is zigzag in the cross section and flexible in the radial direction of the tire.

Moreover, the inner circumferential surface of the main body 2 is formed so as to be able to fit with the dividable rim 12, and in this example comprises bead base parts 16 to be fitted on bead seats 15 and a riblike part 18 to be inserted in a well 17.

Accordingly, by the presence of the indentations 6, the rigidity of the tire as a whole, in this example particularly the rigidity in the radial direction is largely reduced, and advantageously the rigidity is easily and precisely adjusted by changing the number and dimension of the indentations 6.

Figure 4:
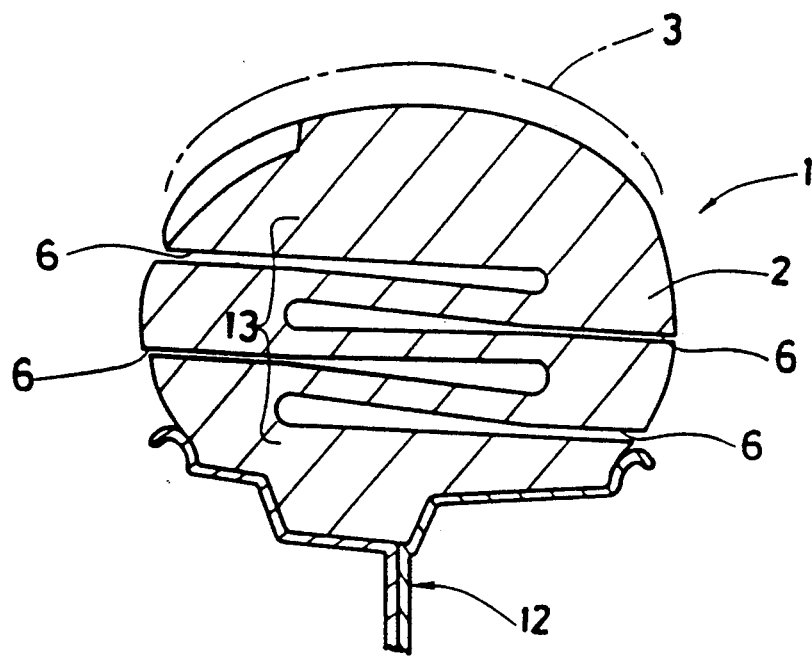
FIG. 4 is a sectional view showing the operation of indentations thereof.
Figure 3:
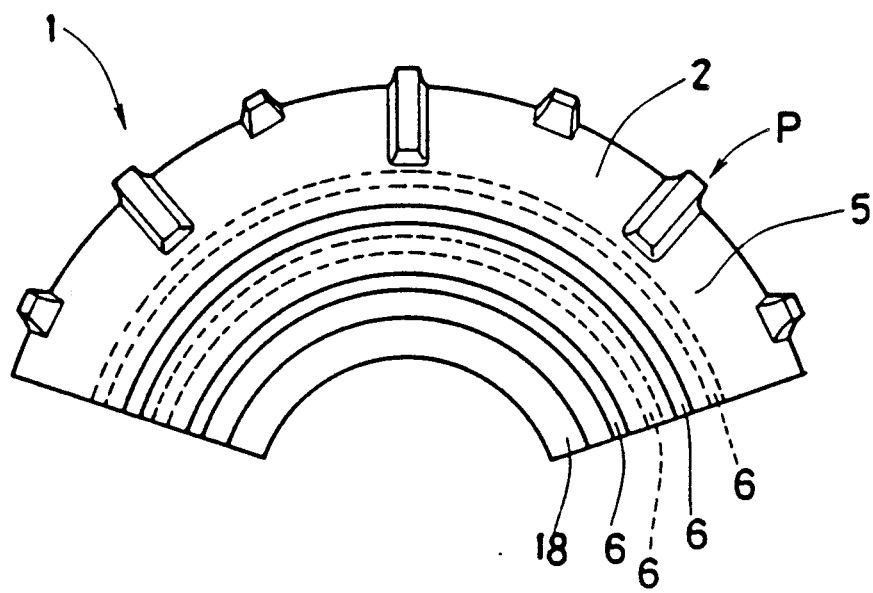
FIG. 3 is a side view thereof.

FIG. 4 shows the operation of the indentations 6 when the tire is subjected to radial force. The main body 2 is easily compressed in the radial direction for the elastic deformation of the spring-elastic part 13, and can exhibits a shock absorbing performance like that of a pneumatic tire.

Figure 6:
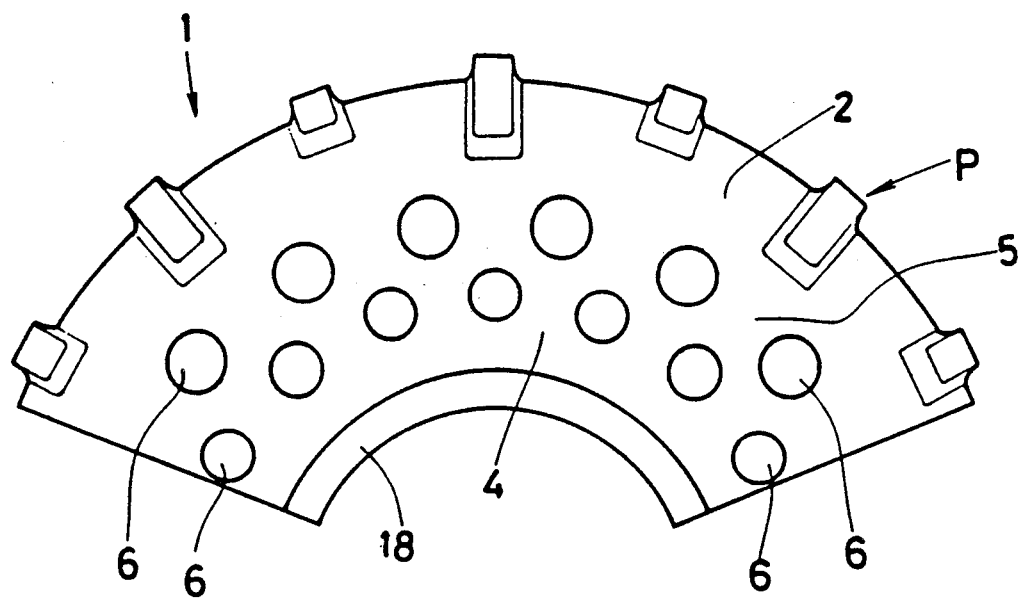
FIGS. 5 and 6 are side views each showing the second embodiment of the present invention.
Figure 5:
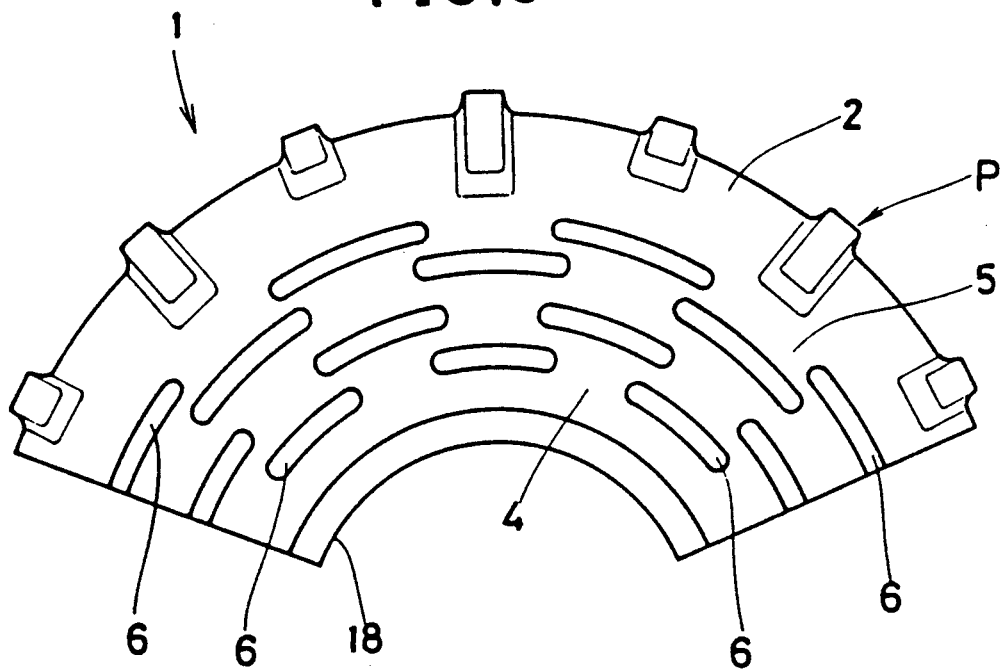

FIGS. 5 and 6 shows the second embodiment of the present invention, wherein the indentations 6 each extend in the axial direction of the tire through the main body 2 so that both ends of each indentation is opened at at the sidewall surfaces 4, respectively, and accordingly, the indentations 6 extend discontinuously in the circumferential direction of the tire. In other words, plural indentations are circumferentially arranged along at least a cylindrical plane while keeping a distance from each other.

The shape of the indentation may be formed in various shapes in addition to such lengthened circles and circles as shown in FIGS. 5 and 6, Owing to the indentations 6 passing through the main body 2 as described above, the circulation of the air in the indentations, that is, the radiation of heat and further the discharge of foreign objects such as the sands and pebbles are promoted. Furthermore, it becomes easy to take out the foreign objects from the indentations.

Figure 7:
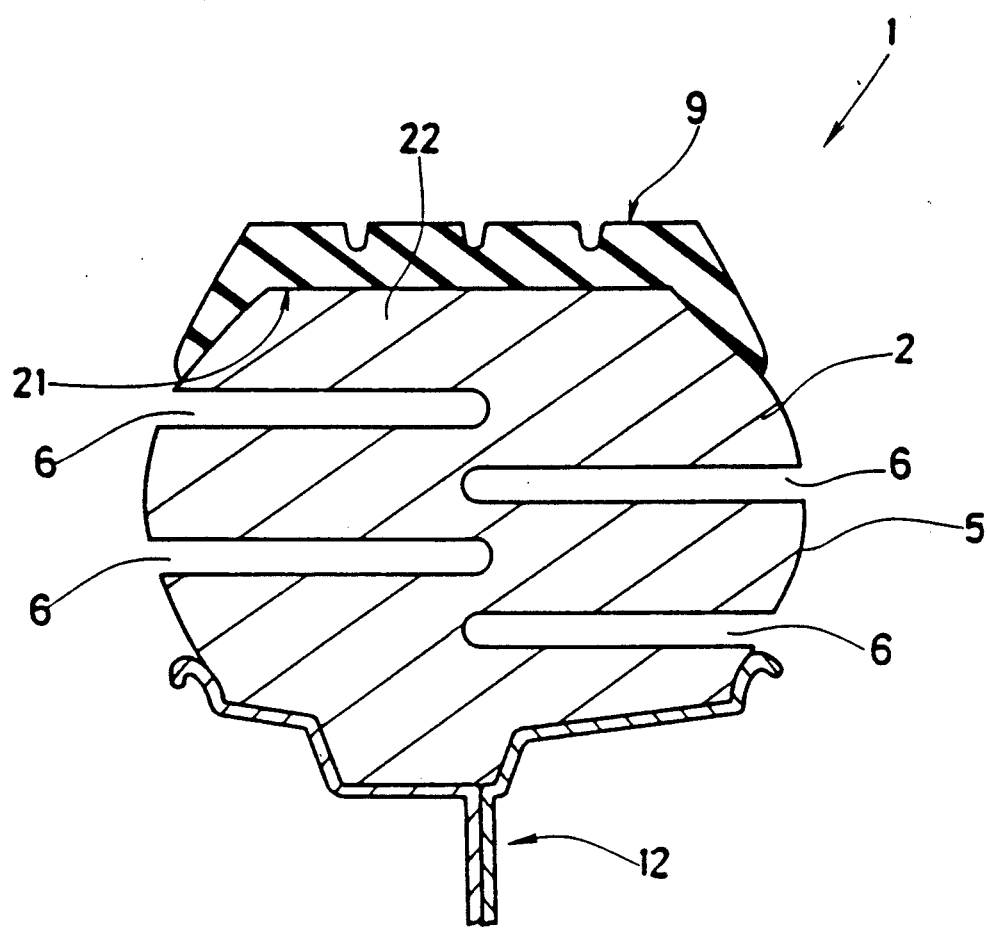
FIG. 7 is a sectional view showing the third embodiment of the present invention.

FIG. 7 is a sectional view showing the third embodiment of the present invention, wherein the tire 1 comprises the main body 2 and a band 9 disposed therearound to contact with the ground. The band 9 is accordingly made of such material as suitable for contacting with ground. In this example, the band 9 is made of the same rubber as the tread rubber used in the pneumatic tires, and the main body 2 is made of synthetic resin having a rigidity larger than the abovementioned rubber.

The band 9 is formed into a circular body, and vulcanized previously to mounting on the main body. Furthermore, a tread pattern is formed on the outer circumference and on the inner circumference there is formed a receiving portion 21 into which a inserting portion 22 formed on the outer circumference of the main body 2 is inserted. In this example, the receiving portion 21 is a circumferentially extending wide groove, and the inserting portion 22 is a circumferentially extending convex portion around the main body 2. The band and the main body are fixed each other by the use of a bonding agent, heat deposition or the likes.

In this example, the rigidity of the tire is adjusted to be higher than that of the first embodiment by making the indentations 6 comparatively shallower.

Accordingly, the stored technique in the tread patterns of the pneumatic tires can apply to the casting type 1 of this example having the band 9 made of rubber, and it is possible to manufacture tires having various kinds of characteristics.

In addition, the band 9 is supported from the inside thereof by the main body 2 having higher rigidity than the band 9. Accordingly, the contacting pressure with ground becomes even, and uneven wear is lessened.

Methods of manufacturing the casting tires according to the present invention will now be briefly described.

Figure 8:
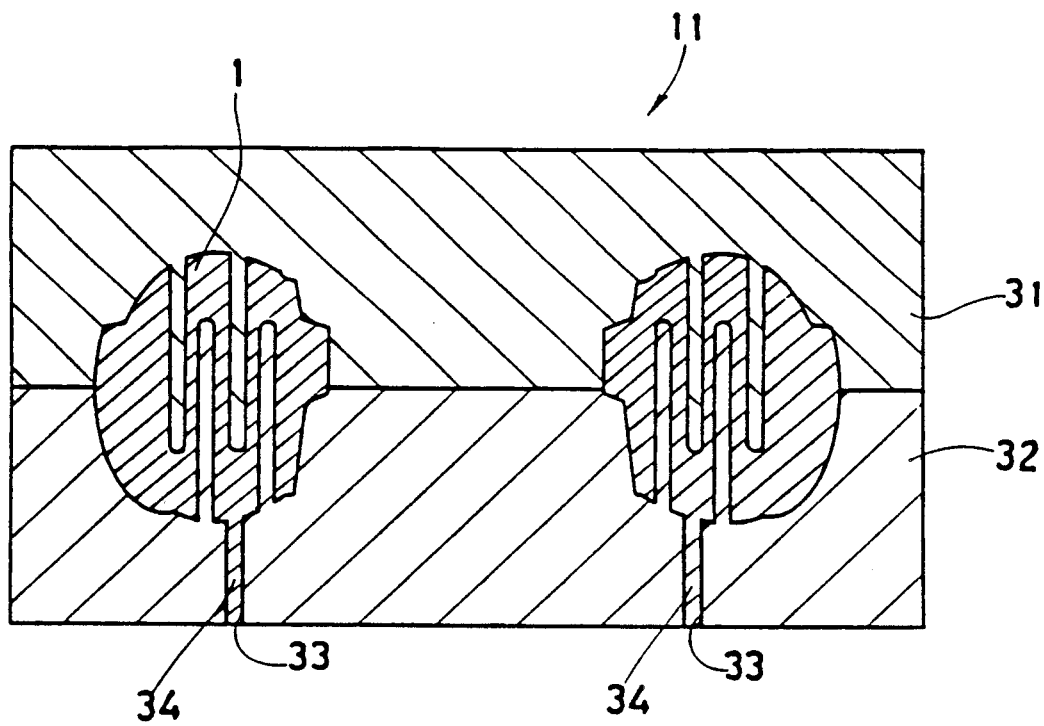
FIG. 8 is a schematic sectional view showing a method of manufacturing a casting tire according to the present invention.

FIG. 8 shows a casting mould for moulding such a tire as has the indentations which are formed on the sidewall surface of the main body and extend in the axial direction of the tire. The casting mould 11 of FIG. 8 is the one for the casting tire of the abovementioned first embodiment, and the mould can be divided at a equatorial plane of the tire into an upper mould 31 and an under mould 32.

Such material 34 as a liquid resin or the likes is poured into the casting mould 11 from inlets 33 and hardened.

Figure 9:
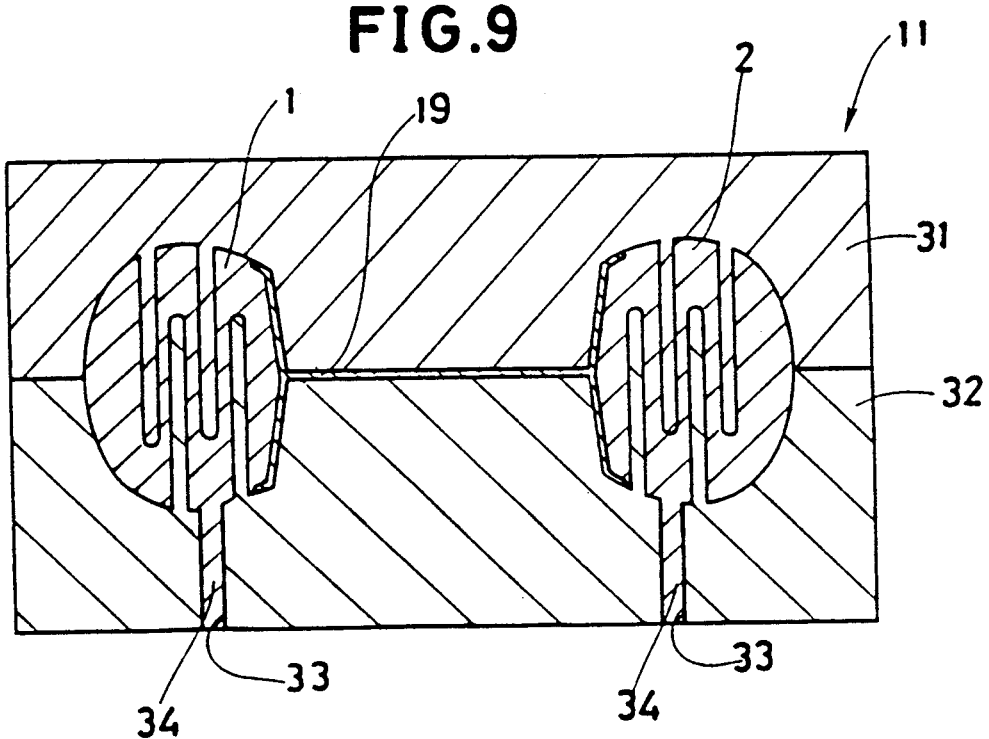
FIG. 9 is a schematic sectional view showing another method of manufacturing a casting tire according to the present invention.

FIG. 9 shows another example of the manufacturing method, wherein a rim 19 is set in the casting mould 11 previously to pouring the material. Accordingly, the moulding of the tire and the assemble of the tire and the rim are simultaneously finished, and there is no need to use the dividable rim.

Figure 10:
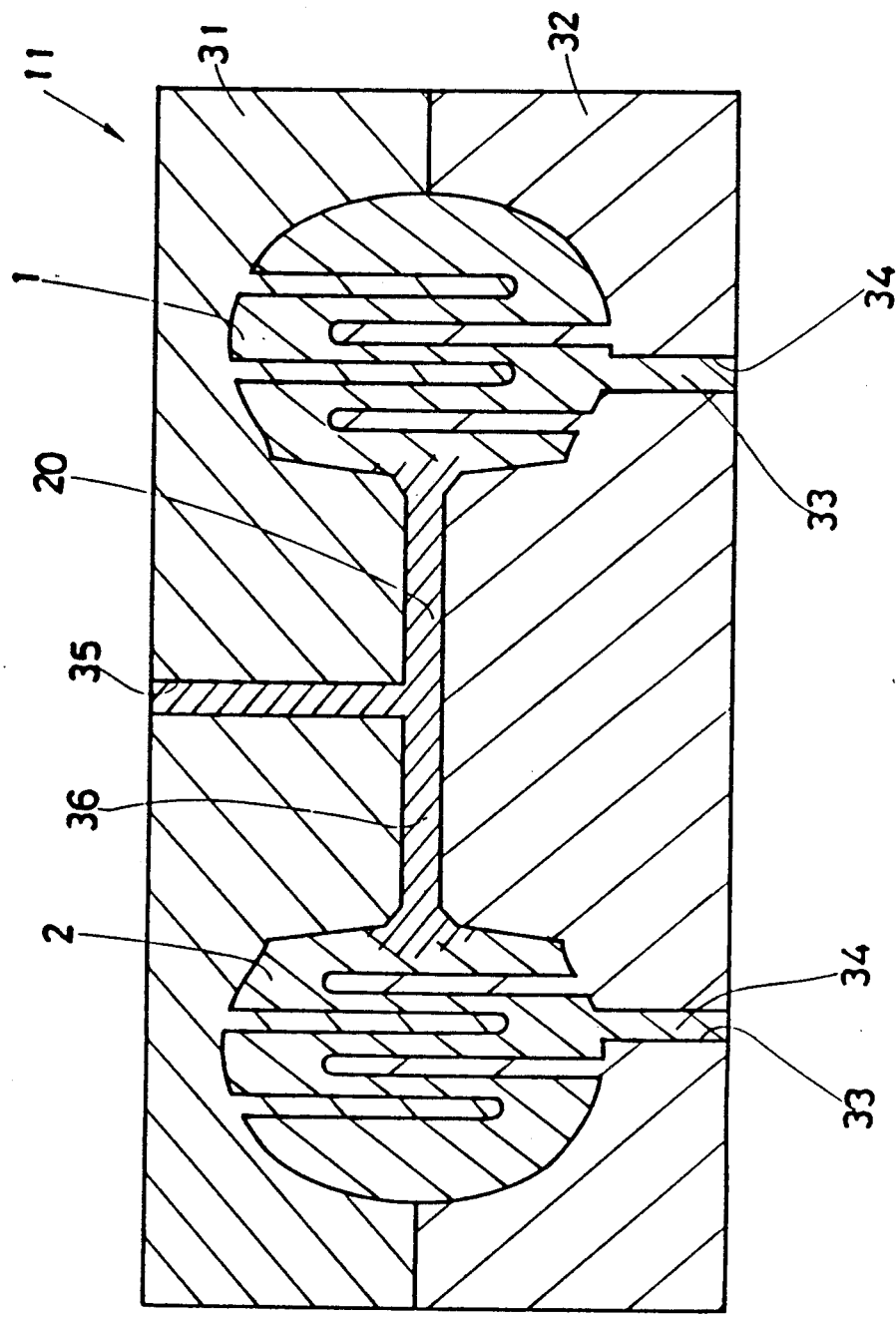
FIG. 10 is a schematic sectional view showing another method of manufacturing a casting tire according to the present invention.
Figure 14:
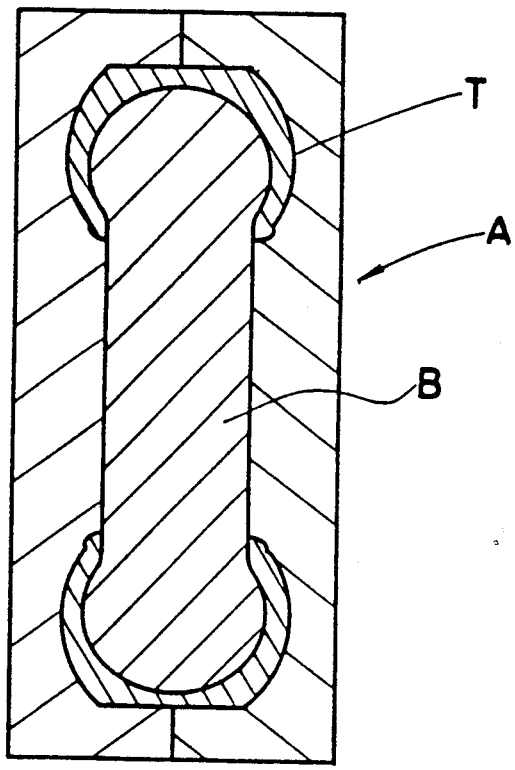
FIG. 14 is a schematic sectional view showing the casting tire and the manufacturing method therefor according to the prior art.

FIG. 10 shows a further example of the manufacturing method, wherein the casting tire 1 includes a rim portion 20 moulded as one body together with the main body 2.

The material of the rim portion 20 may be same with that of the main body 2, but it is more preferable to change the material of the rim part 20 from that of the main body 2 by pouring the synthetic resin 34 from the inlets 33 to the main body 2 and further, from another inlet 35 to the rim portion 20, pouring synthetic resin 36 to show a larger rigidity than that of the main body.

Accordingly, in this casting tire and method, the tire can be produced most efficiently because not only the above-mentioned rim assembling work, but also the rim setting work in the previous example, are not required.

Figure 11:
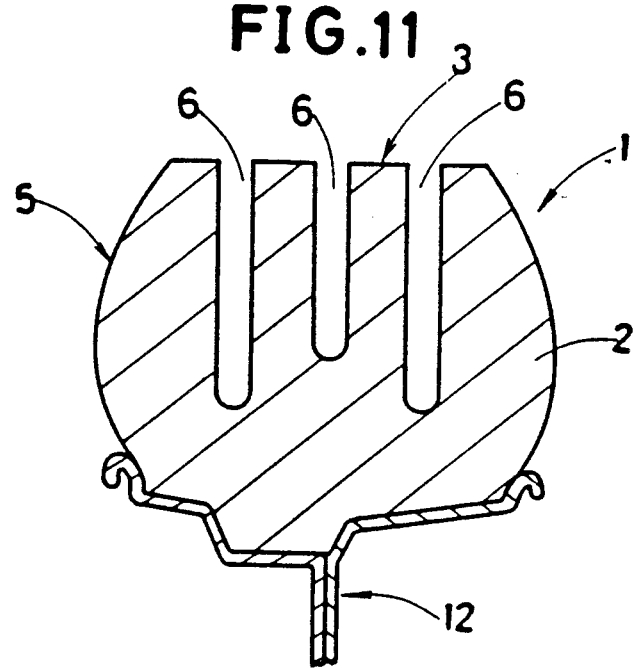
FIG. 11 is a sectional view showing the fourth embodiment of the present invention.

In the formed examples, the indentations 6 are formed on the sidewall surfaces 4 of the region 5, but, as shown in FIG. 11, the indentation 6 may be formed on the tread surface 3.

The casting tires according to the present invention were manufactured by way of trial and compared with conventional pneumatic tires in various performances.

The test tires were for all terrain vehicles (ATV) and AT19X7-8* in size.

The ATV used was a four wheeled vehicle of 80 cc displacement, and four tires were mounted on the front wheels and the rear wheels.

In an unpaved rough test course, comparative tests for steering stability, straight running stability grip force were made. Such properties of tire were evaluated by five skilled test riders' feelings, and the evaluations are averaged. The results are shown in table 1, wherein the evaluations are indicated by an index based on the assumption that the evaluation of the pneumatic tire (0.2 kgf/sq. cm inner pressure) is 100. The larger the number is, the better the performance is.

From the test result, it will be seen that tire A according to the present invention is slightly inferior to a pneumatic tire B (0.2 kgf/sq. cm inner pressure) in steering stability, ride feeling and grip force, but they are enough level for actual use, whereby the availability has been proved.

In the pneumatic tire B with 0 kgf/sq. cm inner pressure, that is, under the flat condition, steering stability and durability were largely decreased, and also straight running stability is decreased, so it is almost impossible to use such tire B. On the other hand, it is seen that tire A according to the present invention is free of flat and capable of running safety.

Incidentally, as shown in the drawings, the test tires have the same tread pattern and the almost same cross sectional profile.

TABLE 1

Figure 13:
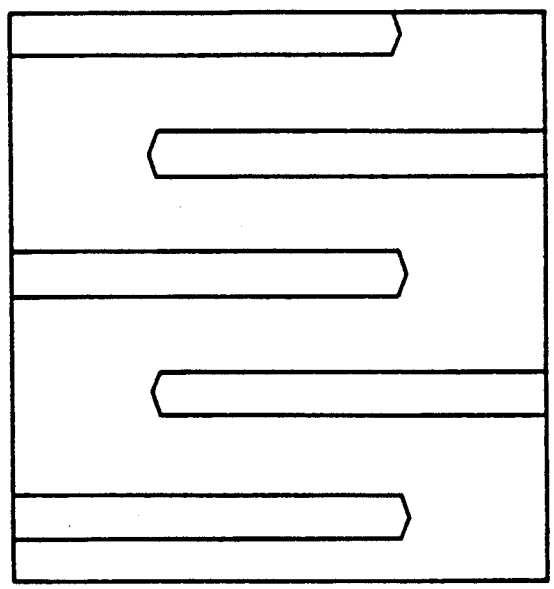
FIG. 13 is a plan view showing the tread pattern thereof.
Figure 12:
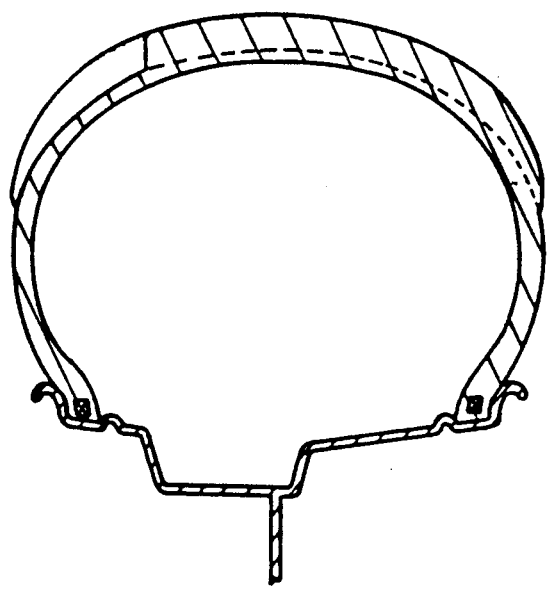
FIG. 12 is a sectional view showing a pneumatic tire used as a reference tire in a comparison test.

| Inner pressure (kg/sq. cm) | Working Ex. Tire A (*1) | Reference Tire B (Pneumatic tire) (*2) 0.20 | 0 (no balve core) |
|---|---|---|---|
| Steering Stability | 90 | 100 | 20 |
| Ride Comfort | 90 | 100 | |
| Straight running stability | 100 | 100 | 60 |
| Grip (*3) | 90 | 100 | 80 |
| Durability | 100 | 100 | 5 |
| Shape | FIGS. 1–3 (*4) | FIG. 12–13 | |

(*1) Material of main body: Thermo plastic polyester elastomer (HAITORERU 4047: TOURE-DUPON)
(*2) Carcass: 2 plies, Nyron 2/840d 55 ends/5 cm, Bias angle = 70 deg. Tread rubber: Natural rubber (JIS-A Hardness = 60 deg.)
(*3) Running distance until Tire failure is occured when running continuously under the following condition: Load = 58 kg, Speed = 40 km/h, Rim = 8 × 5.5 AT Each distance is indicated using an index based on the assumption that the distance in Tite A is 100.
(*4) Indentation: Width = 10 mm, Depth = 125 mm As described above, according to the present invention, the casting tire comprises the elastic main body provided with at least one indentation in part of a region including the tread surface and the sidewall surfaces, whereby characteristics similar to those of the pneumatic tires can be obtained because the indentation reduces the rigidity of the main body.

Furthermore, it can be produced by such manufacturing method as the injection moulding, bringing about many advantages such that massproduction and high stability of quality may be possible.

The present invention can be applied to various kinds of tires such as low rigidity tires like a ATV tire, intermediate rigidity tires like a heavy duty tire by changing the number of the indentations and the dimensions thereof.

I claim:

1. A casting tire comprising:
   an elastic main body having a tread surface and sidewall surfaces each extending from one edge of said tread surface,
   the main body being provided with at least one indentation on each of the sidewall surfaces,
   the indentations extending substantially to the tire equatorial plane from the sidewall surface in the axial direction of the tire, and the indentations extending substantially continuously in the circumferential direction of the tire.

2. A casting tire according to claim 1, wherein said main body is made of rubber.

3. A casting tire according to claim 1, wherein said main body is made of synthetic resin.

4. The tire according to claim 1, wherein the main body is provided on each of the sidewall surfaces with at least two indentations arranged in the radial direction of the tire.

5. The tire according to claim 4, wherein the indentations are provided in the radial direction of the tire so that the indentations alternate in the radial direction of the tire.

6. The tire according to claim 5, wherein the indentations extend beyond the tire equatorial plane in the axial direction of the tire.

7. The tire according to claim 6, wherein the elastic main body has an circumferential inner portion for being fitted with a tire rim, said inner portion comprising a rib part for insertion into a well of a tire rim and a base part for being fitted on the bead seats of said tire rim.

8. A casting tire comprising a main body and a tread, the main body being made of a synthetic resin and provided on each side thereof with at least one indentation extending inwardly of the tire to decrease the radial rigidity of the main body, and the tread being made of a rubber and disposed on the periphery of the main body, wherein the main body has sidewall surfaces each extending from one edge of said tread, and wherein the indentations are provided in the sidewalls and extend substantially to the tire equatorial plane from the sidewall surface in the radial direction of the tire, said indentations extending substantially continuously in the circumferential direction of the tire.

9. The tire according to claim 8, wherein the main body is provided on each of the sidewall surfaces with at least two indentations arranged in the radial direction of the tire.

10. The tire according to claim 9, wherein the indentations are provided in the radial direction of the tire so that the indentations alternate in the radial direction of the tire.

11. The tire according to claim 10, wherein the indentations extend beyond the tire equatorial plane in the axial direction of the tire.

12. The tire according to claim 11, wherein the elastic main body has an circumferential inner portion for being fitted with a tire rim, said inner portion comprising a rib part for insertion into a well of a tire rim and a base part for being fitted on the head seats of said tire rim.

* * * * *